Sept. 27, 1932.  F. ERICKSON  1,879,666
ROTARY HARROW
Filed Jan. 21, 1932  3 Sheets-Sheet 1
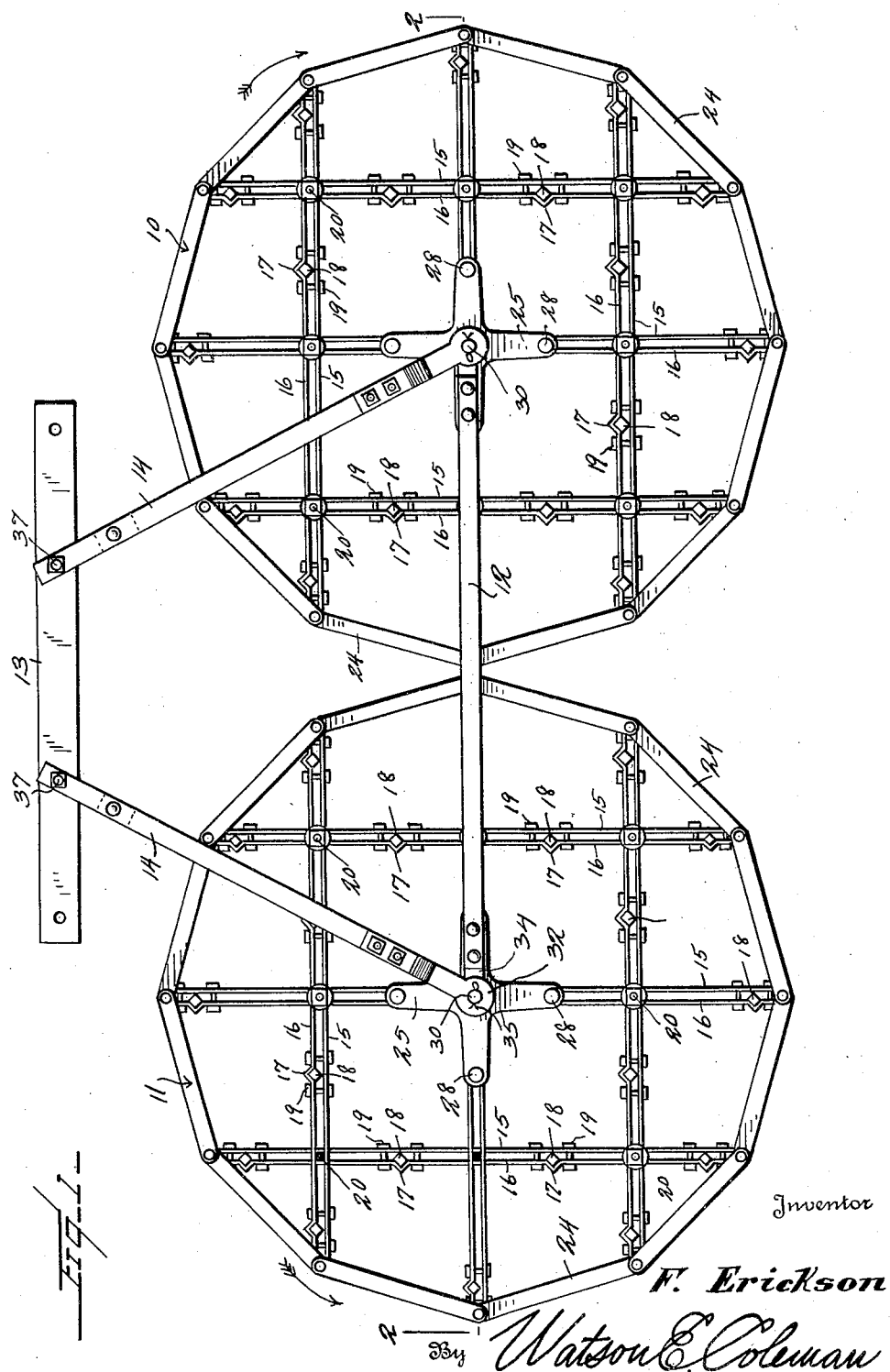
Inventor
F. Erickson
By Watson E. Coleman
Attorney Sept. 27, 1932.  F. ERICKSON  1,879,666
ROTARY HARROW
Filed Jan. 21, 1932   3 Sheets-Sheet 2
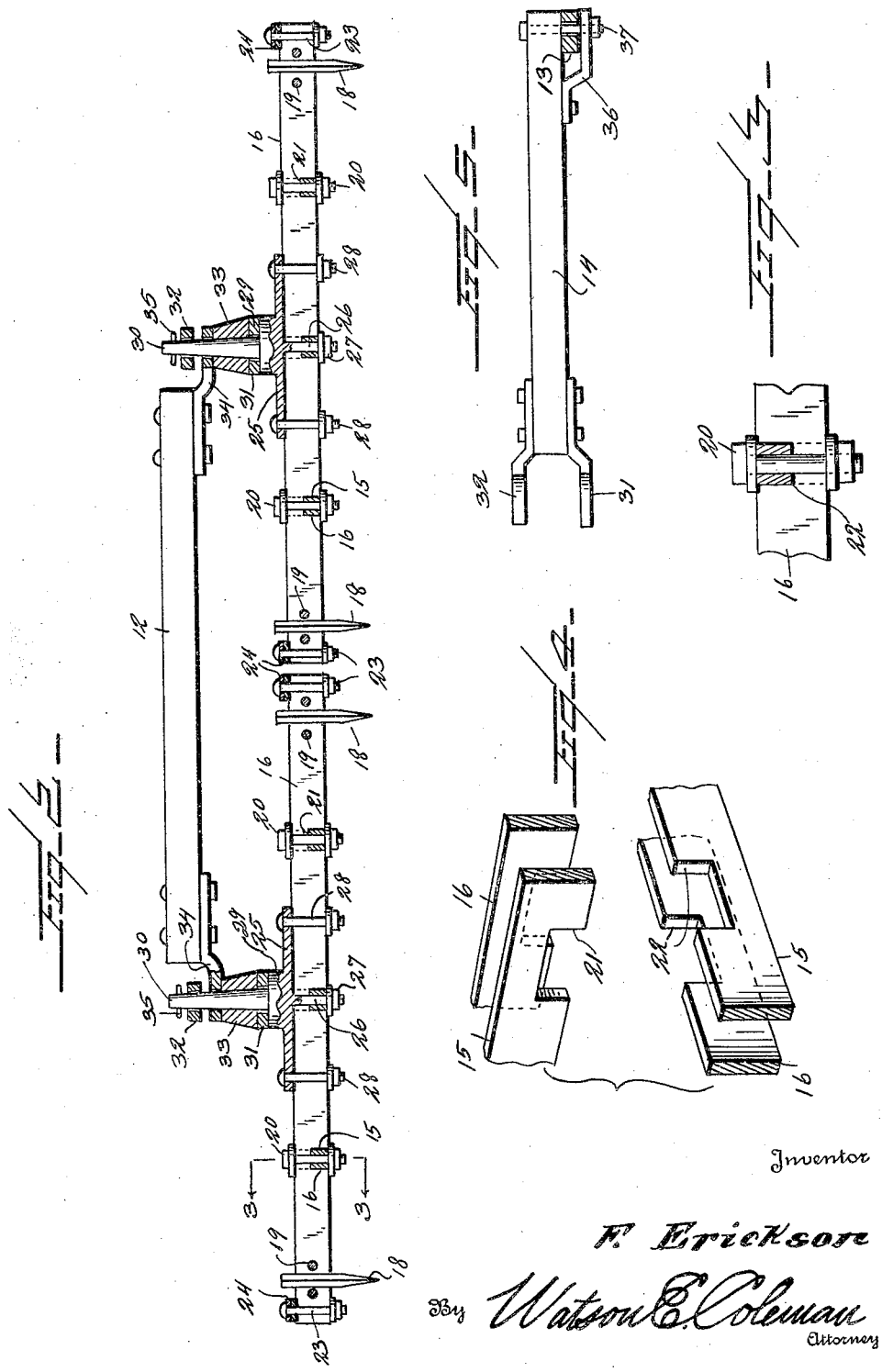
Inventor
F. Erickson
By Watson E. Coleman
Attorney

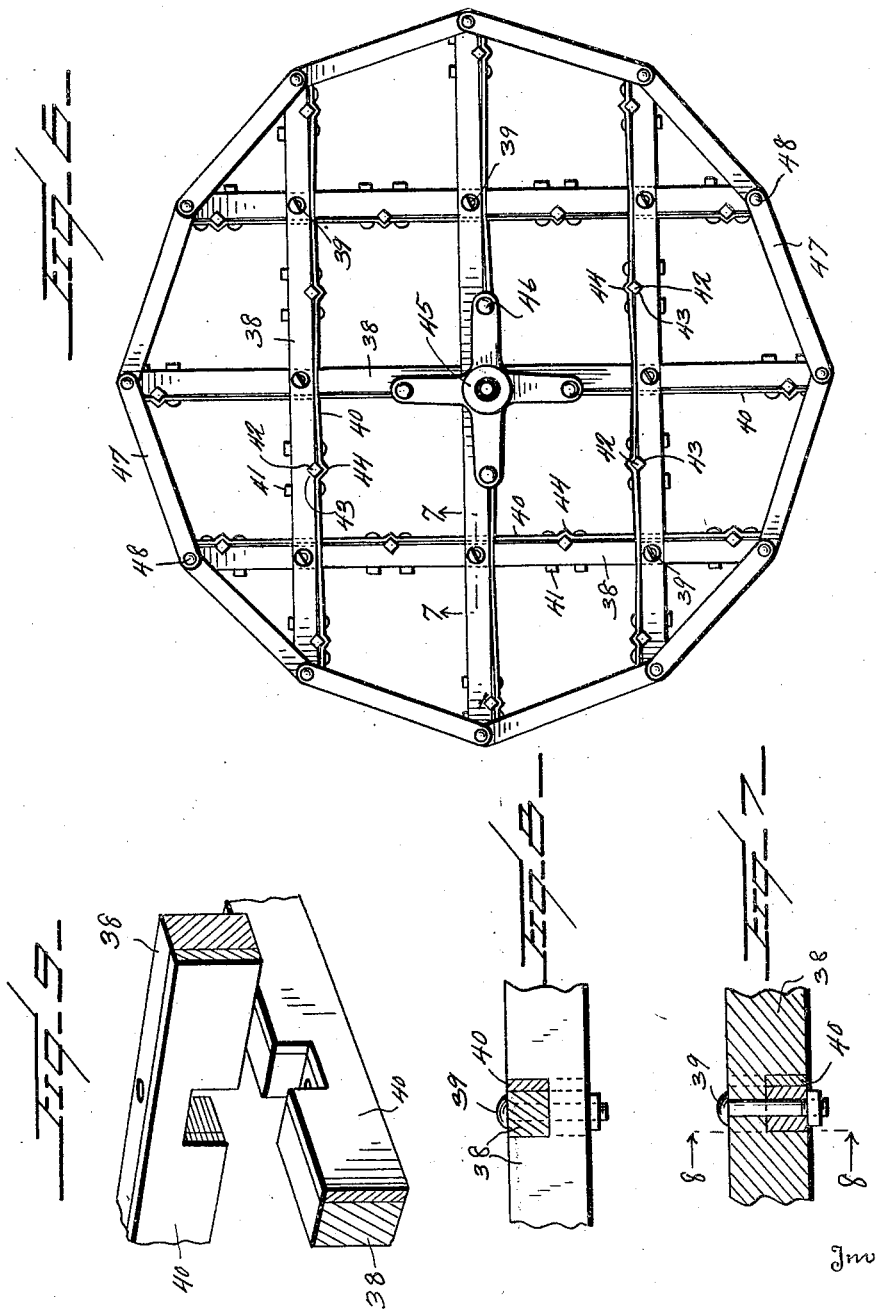

Patented Sept. 27, 1932

1,879,666

UNITED STATES PATENT OFFICE

FRED ERICKSON, OF WATERVILLE, KANSAS

ROTARY HARROW

Application filed January 21, 1932. Serial No. 588,007.

This invention relates to rotary harrows and particularly to a harrow embodying two toothed rotary elements mounted in adjoining relation to each other and so mounted that they will rotate in opposite directions, the rotary elements having ground engaging teeth.

A further object is to provide an improved mounting for rotary harrows of this character such that the harrow may be drawn either by horses or by a tractor.

A further object is to improve details of construction and arrangements of parts as will appear more fully hereinafter.

My invention is illustrated in the accompanying drawings, wherein:—

Figure 1 is a top plan view of a harrow constructed in accordance with my invention;

Figure 2 is a section on the line 2—2 of Figure 1;

Figure 3 is a section on the line 3—3 of Figure 2;

Figure 4 is a fragmentary sectional perspective view showing the two pairs of harrow frame bars disposed in right angular relation but before connection with each other;

Figure 5 is a side elevation of one of the draw bars, the transversely extending draft bar being shown in section;

Figure 6 is a plan view of a harrow element having wooden frame members;

Figure 7 is a section on the line 7—7 of Figure 6;

Figure 8 is a section on the line 8—8 of Figure 7;

Figure 9 is a fragmentary perspective view partly in section showing the intersection of the wooden elements.

Referring to these drawings and particularly to Figures 1 and 2, it will be seen that I have provided two rotatable elements designated generally 10 and 11, these elements being the same in general construction. These elements are held apart by a spacer bar 12 and a hitch bar 13 is operatively connected to these elements by the draft bars 14. Referring to the detailed figures, it will be seen that each one of the harrow elements 10 or 11 comprises the pairs of spaced bars 15 and 16, these pairs of bars extending parallel to each other, the bars 16 being formed with angular depressions 17 in their length so as to receive between the bars and in these angular depressions the harrow teeth 18. These pairs of bars are forced into clamping engagement with the harrow teeth by the bolts 19.

As illustrated, there are three pairs of bars 16 and 15 extending in one direction and three pairs of like bars 15 and 16 extending at right angles to first pair of bars so that the pairs of bars of one set intersect the pairs of bars of the other set. At the intersection of the pairs of bars as illustrated in Figures 2 and 3, there are disposed the bolts 20.

Preferably the pairs of bars 15 and 16 extending in one direction as illustrated in Figure 4 are notched upon their lower margins as at 21 while the pairs of bars 15 and 16 extending in the other direction or at right angles to the first named bars are notched as at 22 to receive and interlock with the first-named set of bars 15 and 16. This is also illustrated in Figure 3. Thus it will be seen that the bolt 20 acts to hold these two pairs of bars interlocked with each other at their intersections. The interlocking of the bars by means of the notches 21 and 22 acts to prevent any sliding movement of one set of bars relative to the other set of bars and this interlocking of the two sets of bars and their being bolted to each other by the bolts 20 provides a stiff, rigid but light frame as shown in Figure 1. The extremities of the bars are connected by bolts 23 to links 24 which define a circle.

Disposed at the center of the harrow element is a plate 25 shown as provided with four radiating arms. This plate is provided with a central stud bolt 26 which extends down between the bars at the intersection of the middle bars and is, of course, provided with the nut 27. The arms of the plate 25 are also bolted to the pairs of bars by the bolts 28. Each plate is provided with an upstanding hub 29 with an upwardly extending tapered stem or pintle 30. Each of the draft bars 14 at its rear end, as shown in Figure 5, is provided with the rearwardly divergent ears 31 and 32, these ears being pierced for the passage of the pintle 30, the ear 31 resting upon the hub 29. Disposed upon the ear 31 is a frusto-conical washer 33 as shown in Figure 2. Resting upon this washer is an ear 34 attached to the cross bar or spacer bar 12, this ear being, of course, pierced for the passage of the pintle 30.

Above the ear 34, the upper ear 32 is disposed and through the extremity of the pintle 30 passes the retaining pin 35. The forward end of each draw bar 14 is provided with a clevis 36 between which and the extremity of the draw bar the draft bar 13 is attached, as shown in Figure 5, this being held in place by the bolt 37. It will be seen that the bars 14 and 12 constitute an approximately triangular frame by which draft is applied to the centers of the rotatable harrow elements and that the member 12 constitutes a spacer holding these elements in spaced relation to each other at all times.

While in Figures 1 to 5, I have illustrated this harrow as being formed entirely of metallic bars, I do not wish to be limited to this as the rotatable elements of the harrow might be formed primarily of wooden bars with metal strips applied thereto. This is shown in Figure 6. In this figure, it will be seen that the frame of the rotary element is composed of two sets of bars 38 crossing each other at right angles. These bars are held in engagement with each other, as shown in Figure 7 by the bolts 39, the bars being notched to fit over each other, as shown in Figure 9. Associated with each wooden bar 38 is a metallic strip or bar 40 which extends along one side or face of the wooden bar and is held to the wooden bar by means of the bolts 41 which are disposed intermediate the intersections between one set of bars and the other set of bars. The metallic strips are also notched out as shown in Figure 9.

For the purpose of holding the teeth 42 in place, the wooden bars are notched at 43 to receive half the tooth and the metallic bars 40 are pressed out to form a notch to receive the other half of the tooth as at 44. Thus the teeth are held firmly in position in these bars. Associated with the frame thus described is the plate 45 having radiating arms, the ends of these arms carrying the bolts 46 which pass down between the metallic bars 40 and the wooden bars 38 as shown most clearly in Figure 6, thus bolting the plate firmly in place at the center of this rotary element. The plate 45 is the equivalent of the plate 25 and has the upwardly extending spindle or pintle as heretofore described and the rotatable element shown in Figure 6 is to be mounted in precisely the same way as the rotatable elements shown in Figure 1. The extremities of the wooden bars 38 are connected to each other by means of the links 47 which are bolted at their ends to the wooden bars by bolts 48. It will be seen that in both of these structures, the harrow teeth may be removed or new teeth inserted by loosening the bolts 19 in one case or 41 in the other case which will thus permit the bars to separate at this point and permit the removal or insertion of a tooth. Thus the harrow teeth may be readily replaced if they are broken or worn. In both forms of my invention, the rotatable elements of the harrow may be readily taken apart and compactly stored. Also in both forms of my invention, any broken part may be readily replaced and this without the necessity of disassembling the entire harrow element. The draft bar 13 is adapted to be connected either to any animal drawn draft device or to a tractor. When this implement is pulled in a direction at right angles to the draft bar 13, the rotatable harrows will rotate in opposite directions in the manner indicated by the arrows in Figure 1. The rotative movement of the harrow elements will cause a thorough harrowing of the ground and a thorough distribution of anything such as manure, straw or the like which may be disposed upon the ground.

A harrow constructed in accordance with my invention is rigid enough to stand the most severe abuse and may be made of any desired weight necessary for the work to be done. This harrow will not leave straight tooth marks in the ground for water to deepen into small ditches as they may be called but will thoroughly even down and level and break up plowed land. Furthermore it may be used for harrowing land upon which volunteer wheat, crab grass or the like is growing. My harrow in actual practice will not clog up with trash or straw but will continue to distribute the straw or the trash while filling in ruts and ditches.

The reason for this is that the draw bars 14 converge at their forward ends and are pulled together. If they were pulling in a straight line parallel to the line of draft, each harrow would rotate first in one direction and then in the other which would leave piles of trash here and there on the field. It will be noted that the central portion of each harrow, the central portion being defined by the outer pairs of tooth engaging bars, has no teeth as shown most clearly in Figure 2. This portion of each harrow is left empty in case there is too much trash for the teeth to handle. The central portion will then fill up and then as quickly as the teeth clear themselves of trash, the trash which has accumulated in the central portion of the harrow will work out. My improved harrow cuts up and distributes corn stalks or anything that is on the field and distributes it evenly over the field without the necessity of stopping to clean the harrow out and furthermore the ground is torn up and ruts and little ditches are leveled whereas the ordinary drag harrow would not do this work. The links 24 prevent the harrow from getting caught on fence posts and against trees and tearing off the bark of the trees.

While the harrow is supposed to run level, it is to be understood that there is enough play in the castings for it to work on unlevel ground. This harrow as has been demonstrated by actual use may be used when corn is up to four and six inches, it will tear up the ground and let the dirt fill in around the corn, and kill the weeds.

I claim:—

1. A harrow of the character described, including a rotatable harrow element, a frame with which the harrow element is rotatably connected, the harrow element comprising a series of pairs of bars running in one direction and a series of pairs of bars running at right angles thereto and interlocked with the first-named pair of bars, bolts passing through the pairs of bars at the intersections thereof, and harrow teeth detachably held between the pairs of bars.

2. A harrow including a rotatable harrow element, consisting of two sets of pairs of bars, the bars of one set extending at right angles to the bars of the other set, the bars of both sets being notched for interlocking engagement with each other, bolts passing through the intersections of the two pairs of bars, harrow teeth disposed between the bars of each pair, means for clamping the harrow teeth in place, and links connecting the extremities of the pairs of bars with each other.

3. A harrow including a draft bar, a rotable harrow element consisting of two series of pairs of bars, the bars of one series extending at right angles to the bars of the other series, the bars of one series having interlocking engagement with the bars of the other series, bolts passing through the intersections of the bars and engaging one series of bars with the other, harrow teeth disposed between the pairs of bars, bolts holding the harrow teeth in position, a central plate having an upwardly extending spindle, bolts extending downward from the plate and between the pairs of bars, the draft bar having ears engaging said spindle.

4. A harrow of the character described, including a rotatable harrow element comprising two sets of spaced bars, one set of spaced bars extending at right angles to the other set and being interlocked therewith, bolts passing through the two sets of spaced bars at the intersections thereof, harrow teeth disposed between the spaced bars, bolts connecting the spaced bars and holding the harrow teeth in place, elements connecting the extremities of the pairs of bars extending circumferentially around the harrow element, and a plate mounted approximately at the center of the harrowing element and having bolts passing down between the spaced bars thereof, said plate having an upstanding spindle.

5. A rotatable harrow element formed of two sets of spaced metallic bars, the bars of each set being arranged in pairs, the bars of one set crossing the pairs of bars of the other set and the bars of both sets being complementarily cut away at their intersections, bolts passing through the intersections of the two sets of bars and holding them in interlocked relation, harrow teeth disposed between the pairs of bars of each set, bolts connecting said pairs of bars on each side of the harrow teeth, and a spindle plate disposed at the center of the rotatable element having bolts passing downward through intersecting bars, the spindle plate having an upwardly extending spindle.

6. A harrow element formed of two sets of wooden bars, one set being disposed at right angles to the other set, both sets being complementarily notched upon their confronting faces and interlocked with each other, two sets of metallic bars disposed against the side faces of the wooden bars and being correspondingly notched at their intersections, bolts holding the metallic bars to the wooden bars, bolts passing downward through the wooden bars at the intersections thereof, links connecting the extremities of the wooden bars with each other, and harrow teeth disposed between the metallic bars and the wooden bars, the wooden bars being notched to receive the harrow teeth and the metallic bars being complementarily notched to receive the harrow teeth, bolts passing through the metallic bars and the wooden bar on each of the teeth to hold the teeth in place, and a spindle plate disposed upon the harrow element and having bolts passing downward through the space between the wooden bars and the metallic bars, the spindle element having a central upwardly extending spindle.

In testimony whereof I hereunto affix my signature.

FRED ERICKSON.